Aug. 13, 1963    B. F. NICHOLLS ETAL    3,100,641
INFLATABLE ARTICLE AND METHOD OF MAKING
Filed July 11, 1958
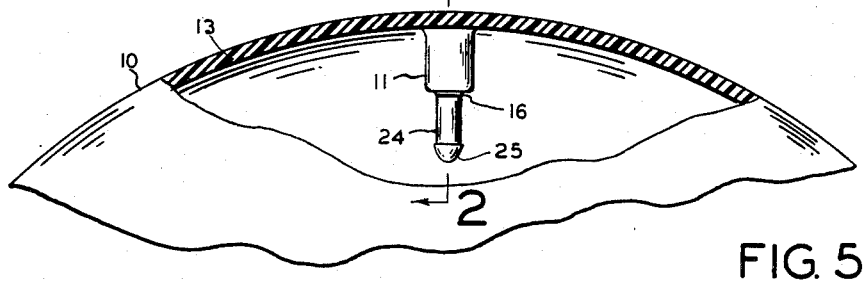
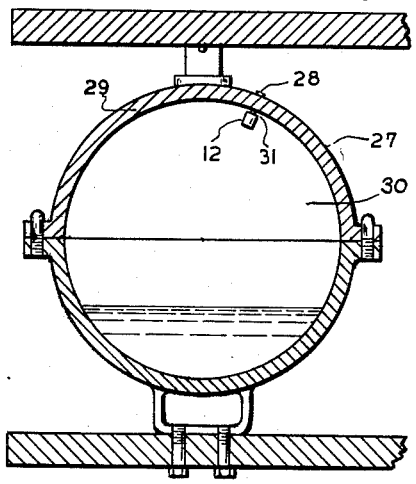
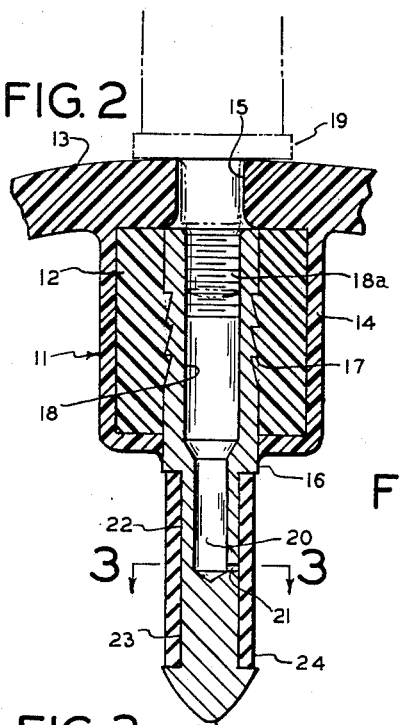
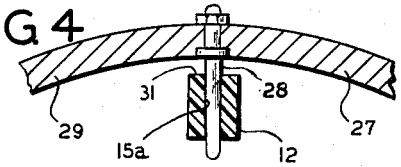
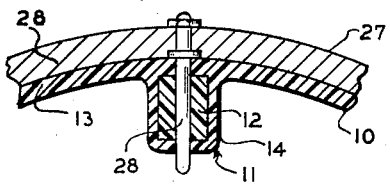
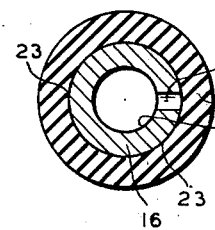
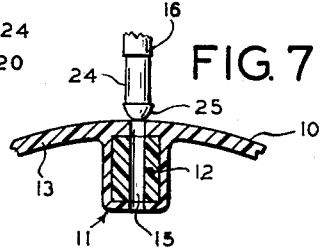
INVENTOR.
BRYAN F. NICHOLLS &
LLOYD R. WHITTINGTON
BY William Cleland
Attorney 3,100,641
INFLATABLE ARTICLE AND METHOD
OF MAKING
Bryan F. Nicholls, Northampton, England, and
Lloyd R. Whittington, Ashland, Ohio
Filed July 11, 1958, Ser. No. 748,066
9 Claims. (Cl. 273—65)

This invention relates to valves for inflatable articles, such as toys, playballs, and athletic balls, such as basket balls, volley balls, and footballs.

Heretofore inflation valves of the type described were frequently of a type which utilized a rubber housing containing a self-sealing material, through which an inflation needle was injected to inflate the balls. This type of valve was objectionable because the self-sealing material sometimes dried out or otherwise lost its self-sealing quality. Frequently the wall of the inflatable article was punctured from within by the inflation needle being improperly directed through the wall of the valve housing. Other types of valves were equally objectionable for various reasons, such as that they were ineffective to seal against escape of inflation air, particularly when foreign particles lodged in the air inlet passages of the valve. Valves of a type involving the use of a self-closing slot in an elastic stem or housing were subject to loss of air sealing effectiveness upon being distorted in normal use of the inflatable article.

One object of the present invention is to provide an improved valve of the character described which is simple in construction, economical to manufacture, and easy to install in an article.

Another object of the invention is to provide an improved inflation valve of the character described which is fool-proof to permit inward passage of inflation air to the interior of the article, and to retain such air under normal conditions of use and abuse of the article.

Another object of the invention is to provide a valve of the character described which is easily installed from the exterior of the hollow article to be concealed inwardly of the wall of the same.

Still another object of the invention is to provide an improved method of producing a hollow inflatable article with the improved inflation valve incorporated therein.

Another object of the invention is to provide a self-sealing valve of the character described which will not be affected by distortion of the article in use to cause leakage of inflation air, and which can be inflated by use of either a suitable inflation needle or a screw type inflation connector.

Another object of the invention is to provide an improved inflation valve including means to prevent misdirection of an inflation needle in a manner to puncture the wall of the article from within.

These and other objects of the invention will be manifest from the following brief description and the accompanying drawings.

Of the accompanying drawings:

FIGURE 1 is a fragmentary view of a spherical athletic ball, partly broken away and in section to show incorporated therein one embodiment of the improved inflation valve.

FIGURE 2 is a greatly enlarged vertical cross-section through the ball and inflation valve, taken substantially on the line 2—2 of FIGURE 1.

FIGURE 3 is a further enlarged cross-section, taken substantially on the line 3—3 of FIGURE 2.

FIGURE 4 is a greatly enlarged fragmentary cross-section through the wall of an article-forming mold, illustrating an initial step in the process of producing an athletic ball to have the improved inflation valve therein.

FIGURE 5 is a fragmentary cross-section, on a reduced scale, of an article-forming cavity mold, illustrating the mold in closed condition for an article-forming step.

FIGURE 6 is a greatly enlarged fragmentary cross-section, corresponding to FIGURE 4, but illustrating the article fully formed in the mold, with valve mounting means in the same.

FIGURE 7 is a view corresponding to FIGURE 6, but illustrating the formed article removed from the mold and also showing the beginning of a step for inserting the improved valve through the valve mounting means, toward the position shown in FIGURE 2.

Referring to FIGURES 1, 2, and 3 of the drawings, there is illustrated a hollow inflatable athletic ball 10, having integrally incorporated in the relatively thin wall 13 thereof a valve housing 11, which protrudes inwardly of said wall. The housing 11 may include a solid cylindrical body or insert 12 of rubber-like elastic material, such as pre-fused polyvinyl chloride, and extensions 14 of material of the wall 13 which are integrally bonded to the insert.

Extending through the wall 13 of the article and the insert 12 may be a cylindrical passage 15, within which an outer end of a metal stem 16 is forcibly received against the resiliency of the block 12, to be firmly affixed in the passage 15 in air-sealing relationship. Annular serrated portions 17 are provided on the outer periphery of the stem 16 to anchor the stem within the insert 12.

Extending axially inwardly through the stem 16 may be a passage 18 for inward reception of a suitable inflation tool, which may include a part adapted to be screwed into a threaded upper end portion 18a in said passage, as shown in chain-dotted lines at 19 in FIGURE 2. The passage 18 has a reduced inward extension 20 at the terminal end of which is a small aperture 21, extending to the longitudinal center of an annular groove 22 defining an elongated cylindrical surface 23. A cylindrical tube or sleeve 24, of air-impervious rubber or like elastic material, may be yieldingly expanded onto said surface 23, substantially to the full length of groove 22, and is thereby adapted normally to seal said opening 21 against escape of inflation air from the article outwardly through the stem passage 18. For inflating the ball 10, however, inflation air is forced from the inflation tool 19 into the passage 18, through aperture 21, and into the space between the tube and sealing surface 23, whereby the tube is yieldingly expanded to allow passage of inflation air around both ends of the same. Tube 24 preferably is of substantial length, as shown, in relation to the size of the aperture 21, to provide a maximum area of sealing surface on the cylindrical stem portion 23. The tube preferably is made slightly shorter than the space between the shoulders to obviate any tendency for the tube to buckle and thereby minimize the sealing contact with surface 23.

The inner end of the stem 16 may be tapered to the blunt point, as indicated at 25, to facilitate insertion of the valve stem assembly through the passage 15 during production of the article, as will be described later.

In use of the improved valve device, inflation air from a suitable source (not shown) is supplied to the interior of ball 10, through tool 19, an inner end of which is threaded into a threaded inner end 18a of the stem, or by insertion of a suitable elongated inflation needle into the stem passage 18. In either instance inflation air is forced through the aperture 21 in the stem to expand the elastic tube 24, and thereby to permit the inflation air to pass the ends of the sleeve to the interior of the article. When the article is fully inflated and the inflation tool 19 is withdrawn, internal pressure within the article will hold the rubber sleeve in tightly contracted, pressure-air sealing relation against the cylindrical surface 23, to prevent return of inflation air outwardly through the passage 18 in the stem.

The outer diameter of the elastic tube 24 preferably is such that the thickness of the wall thereof will be somewhat less than the depth of the groove 22, so that the stem 16 may be inserted through the passage 15, in a manner previously described, with the tube attached to the stem and without dislodging the tube.

One method of the invention will be best described by reference to FIGURES 4 to 7 of the drawings. In practicing such method, there is provided a sectional cavity mold 27, having a pin 28 secured to the wall 29 thereof to project radially inwardly from the article-forming mold cavity surface 30 (see FIGURES 4 and 5). While the mold is open, an operator positions a cylindrical insert 12 of pre-fused vinyl plastic or like material in the mold, by reception of the pin 28 through passage 15a in the insert. The outer end 31 of the insert may be in spaced relation to said cavity surface 30, as shown in FIGURE 4.

After placing a predetermined quantity of heat-fusible, vinyl plastisol, such as polyvinyl chloride, in the bottom part of the mold, the operator closes the mold and causes the same to be rotated about a plurality of axes, in known manner, thereby to form a plastisol into a ball 10 of uniform wall thickness on the article-forming surface 30 of the mold. This rotational step is carried out in the presence of controlled heat which progressively raises the temperature of the contained material to a point at which, after subsequent cooling, the material now forming the article has attained maximum strength and other physical properties.

The formed article (see FIGURE 6) will have a passage 15 formed through the wall 13 of the same and through the insert 12, and the operator by means of suitable tool, now forcibly inserts the rigid valve stem 16 inwardly through said passage 15, pointed inner end 25 first (see FIGURE 7), until the serrated end of the stem is firmly affixed or anchored in the position best shown in FIGURE 2, by contraction of the housing material to full air-sealing relation about the stem. This step in the method is best performed while the housing insert 12 is still hot and relatively soft and pliable, as it would be immediately after removal of the formed article from the mold 27. Under this condition, the soft, pliable inner surface portions of the insert 12, defined by passage 15 thereof, will be molded by compression to the shape of the outer end portion of stem 16. During this step, also, the elastic sleeve 24 is retained in the groove 22 of the stem 16. Upon cooling the article the plug 12 will reharden in solid condition in which it will retain a permanently molded shape about said outer end of the stem, including the serrated portions 17 thereof, and will contract and strongly embrace the stem in full air-sealing relationship.

Articles 10 also may be produced by use of other forming methods, such as by slush molding or injection molding, to have the housing 11 integrally incorporated in the article wall 13. Accordingly, it is contemplated that the housing may be either integral with the article wall 13, or may be otherwise formed with an insert 12 as described. In any event the housing 11 is in complete air-sealing relationship about the valve stem.

Thus has been provided a substantially fool-proof inflation valve of the character described, and a simple and effective method for integrally incorporating the same in a ball or like article. The valve structure described above also has a distinct advantage in that, once the article has been inflated to desired permanent size and spherical shape, it may be deflated by removing the valve stem assembly 16, as by threaded attachment of the tool 19 at the stem part 18a, and forcibly withdrawing the stem assembly from the housing passage 15. To this end, the serrations 17 on the stem 16 are shaped and arranged to facilitate such withdrawal of the stem, but to obviate accidental inward removal of the stem from the housing 11. Accordingly, this feature of the invention herein makes it possible to deflate the ball by removing the stem 16 from housing 12, whereby the finished ball may be shipped or stored in compact, flattened condition. When the flattened ball is required for use, it is only necessary to reinsert the stem 16, as shown in FIGURES 1 and 2, and to inflate the ball as before with use of said inflation tool 19.

Modifications of the invention may be resorted to without departing from the spirit thereof or the scope of the appended claims.

What is claimed is:

1. A hollow inflatable article of flexible elastic material having integrally affixed to the wall thereof an inwardly presented, body of elastic plastic material provided with an inflation passage inwardly therethrough, and an elongated rigid closure member received in said passage, the contacting surfaces of the body passage and said closure member having the structural characteristics resulting from the closure member having been inserted in the body passage while the body was in a heat-softened condition and the body having been subsequently cooled and contracted about the closure member to seal the passage against escape of inflation medium between the closure member and the body.

2. A hollow inflatable article as set forth in claim 1, wherein said material of said body is polyvinyl chloride.

3. A hollow inflatable article as set forth in claim 2, said flexible elastic material of the article being polyvinyl chloride having extensions thereof integrally bonded to said body.

4. A hollow inflatable article as set forth in claim 1, wherein said body is of inherently resilient polyvinyl chloride, said closure member being removable and replaceable with respect to said body against the inherent resiliency thereof.

5. A hollow inflatable article as set forth in claim 1, said closure member being an inflation valve including a rigid stem having irregular anchoring portions about which said molded inner surface portions of said body are yieldingly conformed.

6. A hollow inflatable article as set forth in claim 1, said closure member being an inflation valve, comprising a substantially rigid, elongated stem having an aperture extending inwardly from an outer end thereof to a depth less than the length of the stem, said stem having an outer end portion provided with irregular anchoring portions about which said inner surface of said body passage is yieldingly conformed to anchor the stem in the body for communicating said aperture thereof with the exterior of the article and the stem having an inner end portion extending freely inwardly of said body, said inner end portion having an annular groove therein providing a reduced, uniformly smooth, surface of substantial length, and a tubular elastic sleeve yieldingly expanded on said smooth surface to conform tightly thereto in air-sealing relation, said stem having opening means from said aperture to said smooth surface to be positioned intermediate the ends of the sleeve and the opening means being airsealed by the sleeve, whereby inflation air applied within said stem aperture and said opening means will yieldingly expand said sleeve to permit passage of inflation air past at least one end of the sleeve.

7. A hollow inflatable article as set forth in claim 1, said flexible elastic material of the article being polyvinyl chloride having extensions thereof integrally bonded to said body, and wherein said body is of inherently resilient polyvinyl chloride, said closure member being removable from said body against the inherent resiliency thereof, said closure member being an inflation valve including a substantially rigid, elongated stem of generally uniform external diameter and having an aperture extending inwardly from an outer end thereof to a depth less than the length of the stem, said stem having an outer end portion provided with irregular anchoring portions about which said molded inner surface portions of said body are yieldingly conformed, and thereby yieldingly removably to anchor the stem in the body for communicating said aperture thereof with the exterior of the article, and the stem having an inner end portion extending freely inwardly of said body, said inner end portion having an annular groove therein providing a reduced, uniformly smooth surface of substantial length, and a tubular elastic sleeve yieldingly expanded on said smooth surface to conform tightly thereto in air-sealing relation, said stem having opening means from said aperture to said smooth surface to be positioned intermediate the ends of the sleeve and the opening means being air-sealed by the sleeve whereby inflation air applied within said stem aperture and said opening means will yieldingly expand said sleeve to permit passage of inflation air past at least one end of the sleeve, the depth of said groove being greater than the wall thickness of said sleeve to prevent dislodgement of the sleeve upon any insertion of the stem in said inflation passage, said stem having the inner end thereof tapered to facilitate said insertion of the stem into said passage.

8. A method of making a hollow inflatable article, comprising the steps of providing a thin-walled body of elastic material with a housing of vinyl resin formed in the wall of the body, the housing having a passage therethrough from the exterior to the interior of the body, inserting a rigid valve stem inwardly through said passage while said housing is in heat-softened condition to anchor the stem in the housing with a valve outlet end presented freely inwardly of said housing, and cooling the housing to contract the housing about the anchored portion of the stem.

9. A method of making a hollow inflatable article, comprising the steps of providing a sectional cavity mold having a pin projecting inwardly of the article-forming cavity surface of the mold, applying a housing of solid, pre-fused polyvinyl chloride on said pin by reception of the pin in a passage through the housing, moving said mold about a plurality of axes while containing a predetermined quantity of polyvinyl chloride plastisol and in the presence of heat, thereby to deposit said plastisol as a hollow body on said cavity surface and to anchor the housing to the body, opening said mold and removing the formed article therefrom, inserting a rigid valve stem inwardly through said housing passage while the housing is in heat softened condition to anchor the stem in the housing, and cooling said housing to contract the same about said stem.

References Cited in the file of this patent
UNITED STATES PATENTS

| | | |
|---|---|---|
| 1,326,445 | Fewlass | Dec. 30, 1919 |
| 1,518,901 | Collins et al. | Dec. 9, 1924 |
| 1,867,443 | Dieterle | July 12, 1932 |
| 1,919,455 | Wilson | July 25, 1933 |
| 1,981,720 | Crane | Nov. 20, 1934 |
| 2,224,145 | Dugan et al. | Dec. 10, 1940 |
| 2,477,899 | Rempel | Aug. 2, 1949 |
| 2,629,134 | Molitor | Feb. 24, 1953 |
| 2,679,913 | Scott | June 1, 1954 |
| 2,756,495 | Lathrop | July 31, 1956 |
| 2,934,344 | Chupa | Apr. 26, 1960 |
| 2,935,320 | Chupa | May 3, 1960 |